(12) United States Patent
Jenson

(10) Patent No.: US 7,267,308 B1
(45) Date of Patent: Sep. 11, 2007

(54) KITCHEN UTENSIL AND POT LID HOLDER

(76) Inventor: Duane R. Jenson, 7433 Kentucky Ave. North, Brooklyn Park, MN (US) 55428

( * ) Notice: Subject to any disclaimer, the term of this patent is extended or adjusted under 35 U.S.C. 154(b) by 42 days.

(21) Appl. No.: 11/140,180

(22) Filed: May 31, 2005

(51) Int. Cl.
F16M 11/00 (2006.01)

(52) U.S. Cl. ........... 248/176.1; 248/175; 248/176.2; 248/153; 248/249; 248/309.1; 248/311.2; 248/37.3; 248/37.6; 248/174; 248/302; 211/41.4; 211/181.1; 211/41.2; 211/41.11; 99/403; 99/422; 99/426; 99/449; 99/450; 220/487; 220/488; 220/491; 220/572; 220/743; 220/744

(58) Field of Classification Search ........... 248/175, 248/176.1, 176.2, 249, 153, 309.1, 311.2, 248/37.3, 37.6, 174, 302; 211/41.4, 181.1, 211/41.2, 41.11; 99/403, 426, 422, 449, 99/450; 220/572, 487, 488, 491, 743, 744
See application file for complete search history.

(56) References Cited

U.S. PATENT DOCUMENTS

| | | | | |
|---|---|---|---|---|
| 129,105 A * | 7/1872 | Collier | ............... | 248/116 |
| 134,738 A * | 1/1873 | Dudley | ............... | 211/74 |
| 138,538 A * | 5/1873 | Sherwood | ............... | 248/175 |
| 240,891 A * | 5/1881 | Cook | ............... | 220/743 |
| 857,998 A * | 6/1907 | Hart | ............... | 206/162 |
| 1,031,310 A * | 7/1912 | Youngblood | ............... | 248/311.2 |
| 1,271,450 A * | 7/1918 | Duarte | ............... | 220/488 |
| 1,385,841 A * | 7/1921 | Melish | ............... | 220/491 |
| 1,580,847 A * | 4/1926 | Moineau | ............... | 248/302 |
| 1,604,608 A * | 10/1926 | Ryerson | ............... | 220/487 |
| 1,889,669 A * | 11/1932 | Knipe | ............... | 211/85.23 |
| 1,889,670 A * | 11/1932 | Knipe | ............... | 211/85.23 |
| 2,604,288 A * | 7/1952 | Koch | ............... | 248/150 |
| 2,661,172 A * | 12/1953 | Needham | ............... | 248/671 |
| 2,681,785 A * | 6/1954 | Jenny | ............... | 248/210 |
| 2,819,860 A * | 1/1958 | Orbach | ............... | 248/128 |
| 3,305,201 A * | 2/1967 | Thiel | ............... | 248/118 |
| 3,817,395 A * | 6/1974 | LeFever | ............... | 211/170 |
| 4,313,634 A * | 2/1982 | Williams | ............... | 294/166 |
| 4,646,929 A * | 3/1987 | Plissonneau et al. | ....... | 220/491 |
| 4,790,503 A | 12/1988 | Pohler | | |
| D301,105 S | 5/1989 | Maxwell | | |
| 5,127,616 A | 7/1992 | Carney | | |
| 5,330,192 A * | 7/1994 | Amos | ............... | 473/259 |
| 5,396,993 A | 3/1995 | Spitler | | |
| 5,503,062 A * | 4/1996 | Buff, IV | ............... | 99/426 |
| D379,903 S | 6/1997 | Durham | | |

(Continued)

Primary Examiner—Kimberly Wood
Assistant Examiner—Nkeisha Dumas

(57) ABSTRACT

An apparatus includes a base member formed from wire strands conjoined to each other, defining outwardly flanging sides and a bottom surface. One wire has a unitary body provided with ends disposed along sides of the base, support pegs monolithically formed therewith, and lip portions spaced along a longitudinal length of the base member. The wire further has an annular portion monolithically formed with the lip portions, extending upwardly from the base member and traveling inwardly towards a center thereof. Another wire has opposed ends conjoined to the annular portion and one of the base member sides. A tray is seated on the base member and includes a bottom surface and monolithically formed edges. The tray is positioned beneath the annular portion for catching fluids and debris. Rubber caps are positioned about the support pegs for increasing surface area friction and assisting to maintain the apparatus at a stable position.

15 Claims, 4 Drawing Sheets

U.S. PATENT DOCUMENTS

| | | |
|---|---|---|
| D408,229 S | 4/1999 | Hong |
| 6,027,083 A * | 2/2000 | Chang ........................ 248/153 |
| 6,047,932 A * | 4/2000 | Skvorecz ..................... 248/153 |
| 6,119,393 A * | 9/2000 | Wourms et al. ................. 47/39 |
| D468,163 S * | 1/2003 | Blake et al. .................. D7/601 |
| 6,595,120 B1 * | 7/2003 | Tiemann ....................... 99/426 |
| 6,729,479 B2 * | 5/2004 | Morgan .................... 211/41.11 |
| 6,997,329 B2 * | 2/2006 | Ohanian ................... 211/41.11 |
| 2005/0011371 A1 * | 1/2005 | Siegel et al. ................... 99/426 |

* cited by examiner

KITCHEN UTENSIL AND POT LID HOLDER

BACKGROUND OF THE INVENTION

1. Technical Field

This invention relates to lid holders and, more particularly, to a kitchen utensil and pot lid holder for supporting pot lids and culinary implements thereon during cooking operations.

2. Prior Art

Cooks everywhere have experienced the difficulties involved in handling a hot and dripping pot lid. Where to put such a lid has always been a problem. The choice was to put the lid down on a surface while holding onto the pot lid knob, which is easy enough, but leaves a pool of water from condensing steam. Alternatively, one could awkwardly attempt to turn the lid upside down and try to set it upon its knob, thereby eliminating the pool of water but often burning one's fingers instead. It is also difficult to properly stir the contents of a pot while holding the lid thereof, since one only has the use of one hand. Where vigorous stirring is required, the use of two hands becomes necessary, and the cook is forced to place the pot lid on a surface where ii may leave a mess.

In the past, during a cooking procedure, it was also customary for the cook to use a variety of implements, such as spoons, forks or the like. At various times, spoons may be used and then placed aside until needed again. Normally, the cook would employ adjacent counter tops for supporting these implements when not in use. Problems and difficulties have been encountered when employing this procedure inasmuch as food on the implement would run or drain onto the counter top so that cleaning of the top was necessary and in some instances, spillage might even have occurred to the point where the product would drip or drain onto the floor.

Although kitchen utensil and pot lid holders are known in the prior art, they have been insufficient in design. Until the development of the present invention, there has not been a device available for holding both utensils and pot or pan lids in a convenient manner when they are taken off a pot (or pan) in the middle of cooking in order to stir the contents of the pot, add liquids thereto, or some similar action.

Accordingly, a need remains for a kitchen utensil and pot lid holder in order to overcome the above-noted shortcomings. The present invention satisfies such a need by providing an apparatus that is easy to use, durable in design, effective in use, and practical. Such an apparatus provides the user with a convenient holding place for a hot spoon or lid, which keeps a mess contained to one easy to clean area. The apparatus also eliminates the need to hole a hot lid in one hand while trying to stir the contents of a pot with the other. With such a kitchen utensil and pot lid holder, a countertop remains free of spills and unwanted mess, while also preventing a person from burning their countertop surface or hands. The apparatus is appreciated for its convenience and ease of use by professionals in the culinary industry, as a well as everyday persons.

BRIEF SUMMARY OF THE INVENTION

In view of the foregoing background, it is therefore an object of the present invention to provide a kitchen utensil and pot lid holder. These and other objects, features, and advantages of the invention are provided by an apparatus for supporting pot lids and culinary implements thereon during cooking operations.

The apparatus includes a base member formed from a plurality of durable and non-corrosive wire strands directly conjoined to each other for defining a plurality of outwardly flanging sides and a horizontally registered bottom surface. One of the wire strands has a continuous and unitary body provided with end portions disposed along one side of the base member. The one wire strand includes a plurality of support pegs monolithically formed therewith and selectively spaced beneath the bottom surface. Such support pegs preferably have coextensive arcuate shapes equidistantly spaced from the longitudinal axis for effectively balancing a weight of the lids and the cooking utensils supported on the base member.

Such a one wire strand further has a plurality of monolithically formed lip portions spaced along a longitudinal length of the base member and oppositely facing the end portions thereof respectively. The lip portions are equidistantly spaced apart from a centrally registered latitudinal axis that bifurcates the base member. Such lip portions are preferably coextensively shaped for effectively supporting the cooking utensils thereon.

The one wire strand also has a centrally registered annular portion monolithically formed with the lip portions. Such an annular portion extends upwardly from the base member and travels inwardly towards a center thereof such that the annular portion defines an oblique angle offset from a vertical axis and terminates substantially medially between the sides of the base member. The annular portion may have a fixed diameter.

Another wire strand has opposed end portions directly conjoined to the annular portion and one of the sides of the base member such that the annular portion can advantageously adequately support the lid at an upright position during operating conditions. Such another wire strand preferably travels downwardly and oppositely from the annular portions and wraps around another side and travels beneath the base member. One end portion of the wire strand is directly coupled to sides of the base member for effectively distributing a load of the lid and the cooking utensils when the user carriers the apparatus by gripping an apex of the annular portion during transport.

A tray is included that has a solid surface suitably sized and shaped for being seated on the base member. Such a tray includes a substantially planar bottom surface and monolithically formed edges diverging outwardly along the sides of the base member. The tray is centrally positioned beneath the annular portion for advantageously catching fluids and debris dripping off the lid and the cooking utensils.

A plurality of rubber caps are removably positioned about the support pegs. Such rubber caps increase surface area friction between the base member and a support surface for effectively assisting to maintain the apparatus at a substantially stable position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
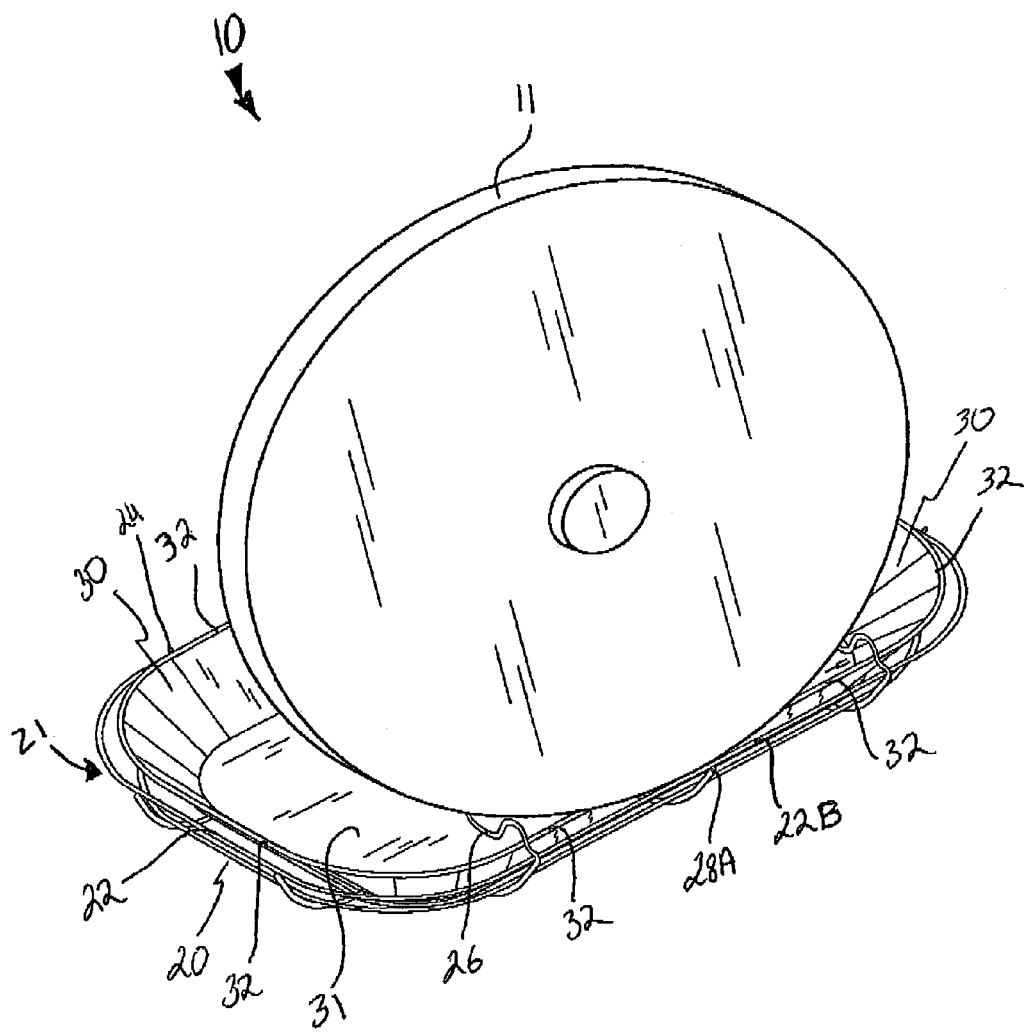
FIG. 1 is a perspective view showing a kitchen utensil and pot lid holder, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth therein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–4 by the reference numeral 10 and is intended to provide a kitchen utensil and pot lid holder. It should be understood that the apparatus 10 may be used to hold many different types of lids and utensils and should not be limited in use to only holding pot lids and spoons.

Referring initially to FIG. 1, the apparatus 10 includes a base member 20 formed from a plurality of durable and non-corrosive wire strands 21 directly conjoined, with no intervening elements, to each other for defining a plurality of outwardly flanging sides 22 and a horizontally registered bottom surface 23. Advantageously, the base member 20 and wire strands 21 may be produced in a variety of different colors, so as to accommodate any kitchen décor, as is obvious to a person of ordinary skill in the art. One of the wire strands 21A has a continuous and unitary body provided with end portions 24 disposed along one side 22A of the base member 20. The one wire strand 21A includes a plurality of support pegs 25 monolithically formed therewith and selectively spaced beneath the bottom surface 23. Such support pegs 25 have coextensive arcuate shapes equidistantly spaced from the longitudinal axis that are essential for effectively balancing a weight of the lids 11 and the cooking utensils (not shown) supported on the base member 20.

Figure 2:
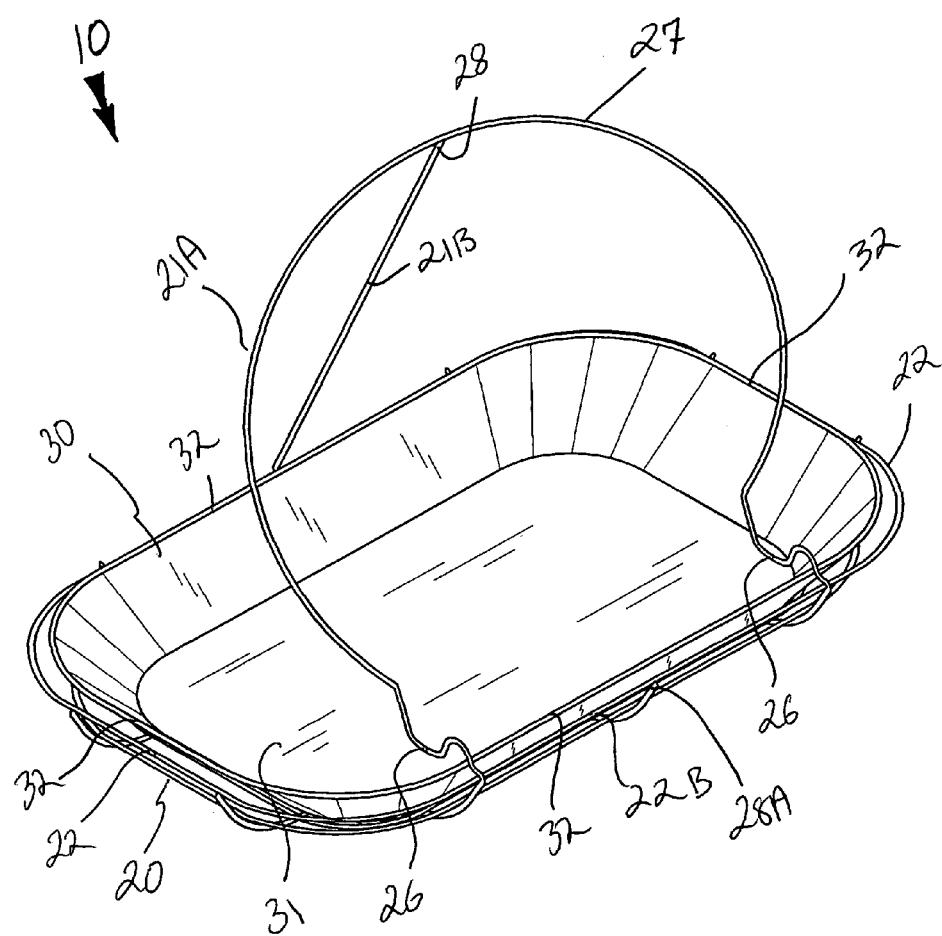
FIG. 2 is a perspective view of the apparatus shown in FIG. 1, showing the pot lid removed therefrom.
Figure 4:
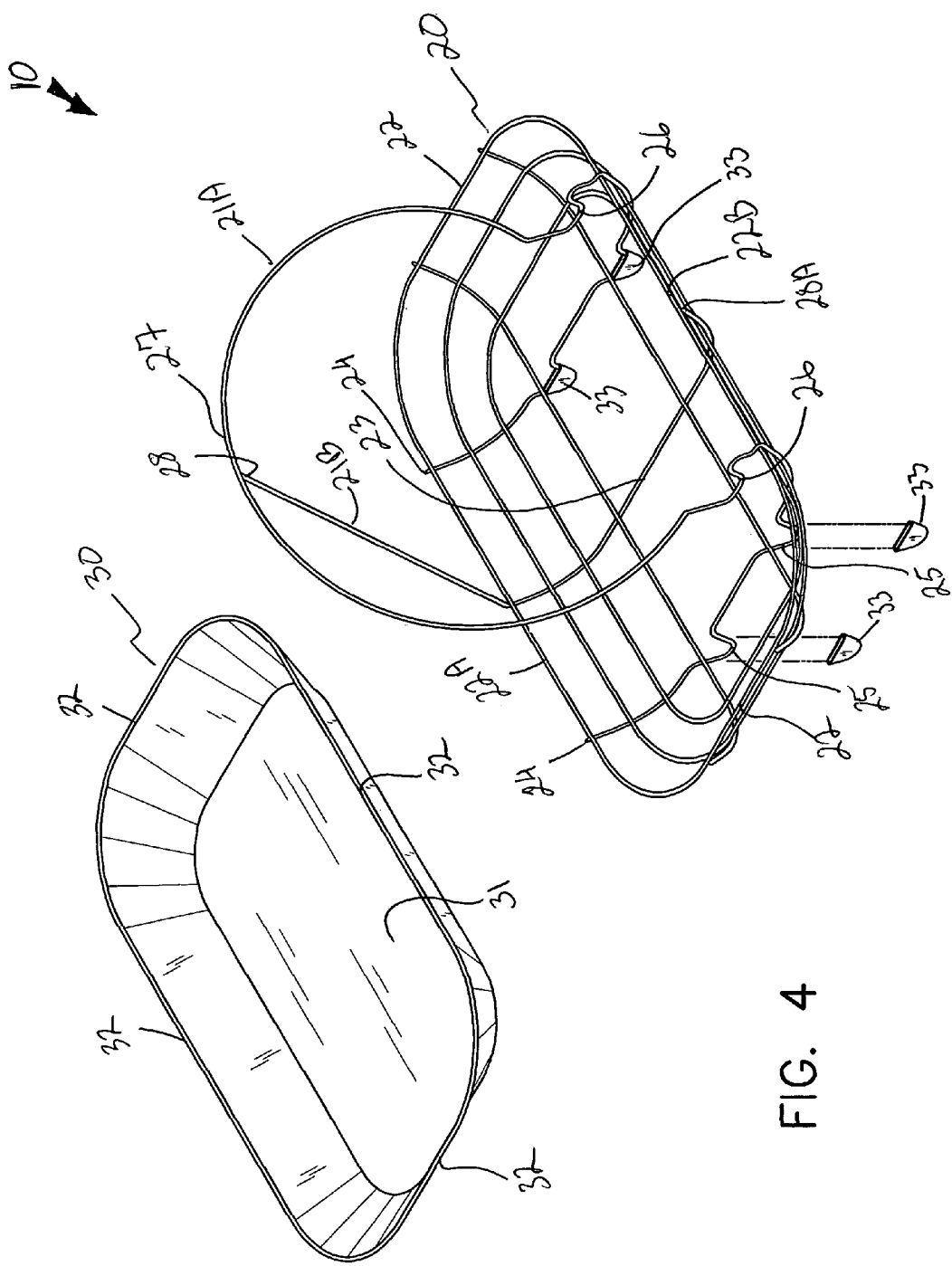
FIG. 4 is a perspective view of the apparatus shown in FIG. 2, showing the tray removed therefrom.

Referring to FIGS. 1, 2 and 4, such a one wire strand 21A further has a plurality of monolithically formed lip portions 26 spaced along a longitudinal length of the base member 20 and oppositely facing the end portions 24 thereof respectively. The lip portions 26 are equidistantly spaced apart from a centrally registered latitudinal axis that bifurcates the base member 20. Such lip portions 26 are coextensively shaped for effectively supporting the cooking utensils thereon, thus advantageously eliminating the mess usually associated with leaving cooking utensils on a countertop or stovetop.

Figure 3:
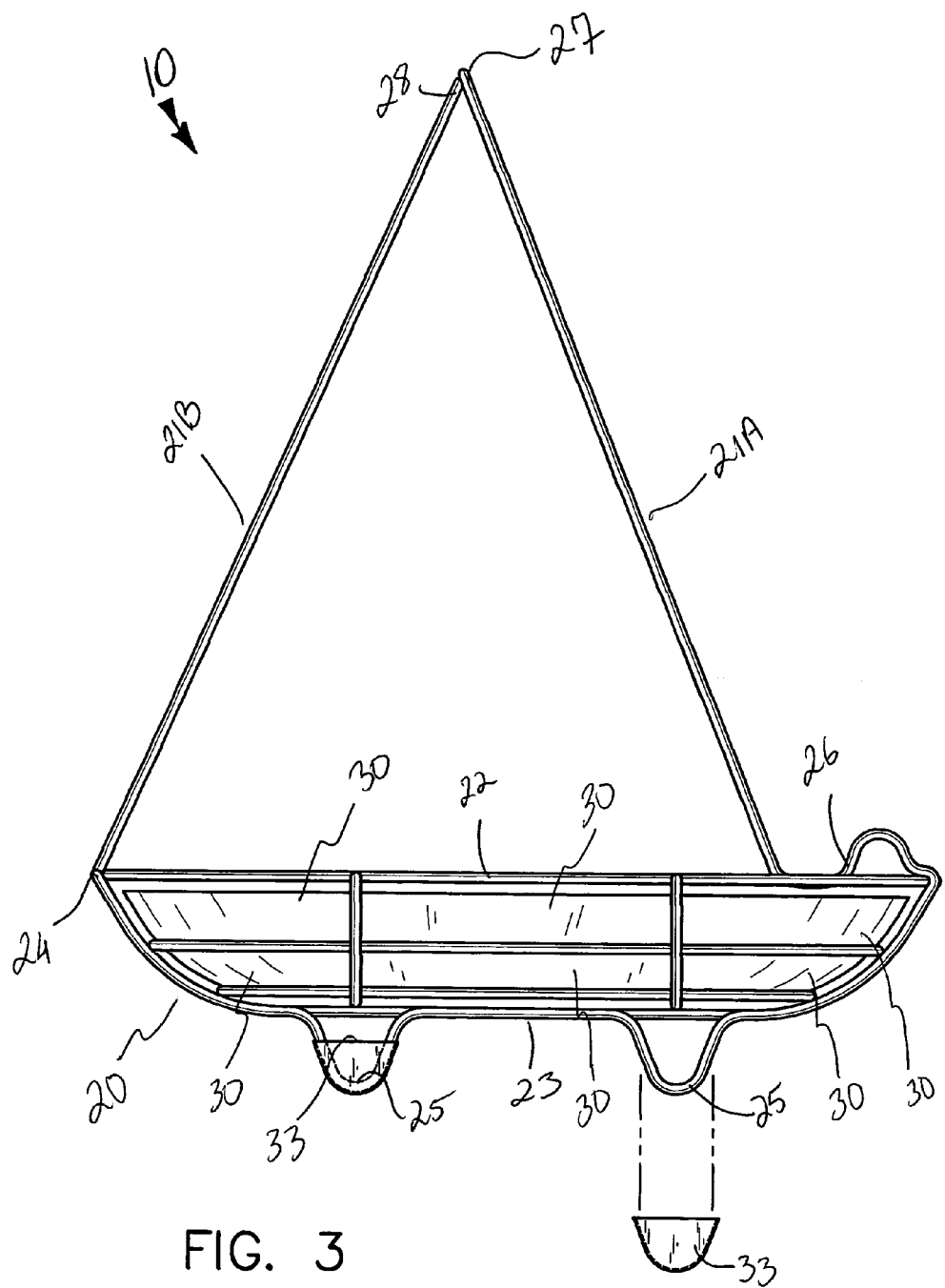
FIG. 3 is a side-elevational view of the apparatus shown in FIG. 2, showing the removable rubber caps.

Referring to FIGS. 2 through 4, the one wire strand 21A also has a centrally registered annular portion 27 monolithically formed with the lip portions 26. Such an annular portion 27 extends upwardly from the base member 20 and travels inwardly towards a center thereof such that the annular portion 27 defines an oblique angle offset from a vertical axis and terminates substantially medially between the sides 22 of the base member 20. The annular portion 27 has a fixed diameter. Of course, the annular portion 27 may be produced in a variety of different shapes, sizes and diameters, so as to support a number of alternately sized lids 11, as is obvious to a person of ordinary skill in the art.

Still referring to FIGS. 2 through 4, another the wire strand 21B has opposed end portions 28 directly conjoined, with no intervening elements, to the annular portion 27 and one of the sides 22B of the base member 20 such that the annular portion 27 can advantageously adequately support the lid 11 at an upright position during operating conditions. This advantageously allows a user the use of both hands while stirring the contents of the pot, which is difficult to do with one hand when holding the lid 11.

Supporting the lid 11 at an upright position also ensures that more debris and fluids will drain therefrom than when laid flat on a support surface and eliminates the chance of the lid burning the support surface. Such another wire strand 21B travels downwardly and oppositely from the annular portion 27 and wraps around another side 22B and travels beneath the base member 20. One end portion 28A of the wire strand 21B is directly coupled, with no intervening elements, to side 22B of the base member 20, which is critical for effectively distributing a load of the lid 11 and the cooking utensils when the user carriers the apparatus 10 by gripping an apex of the annular portion 27 during transport.

Referring to FIGS. 1 through 4, a tray 30 is included that has a solid surface suitably sized and shaped for being seated on the base member 20. Such a tray 30 includes a substantially planar bottom surface 31 and monolithically formed edges 32 diverging outwardly along the sides 22 of the base member 20. The tray 30 is centrally positioned beneath the annular portion 27, which is vital and advantageous for catching fluids and debris dripping off the lid 11 and the cooking utensils. Such a tray 30 can then easily be removed and cleaned, either by hand or in a dishwasher, while maintaining the counter top or stove top free of debris and fluids.

Referring to FIGS. 3 and 4, a plurality of rubber caps 33 are removably positioned about the support pegs 25. Such rubber caps 33 are important for increasing surface area friction between the base member 20 and a support surface for effectively assisting to maintain the apparatus 10 at a substantially stable position. This feature advantageously prevents the apparatus 10 from slipping off of a support surface and dropping any lids or kitchen utensils stored thereon onto the floor. Alternately the rubber caps 33 may, of course, also have magnets incorporated into lower end portions thereof for providing further slipping resistance on magnetic surfaces, as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An apparatus for supporting pot lids and culinary implements thereon during cooking operations, said apparatus comprising:
   a base member formed from a plurality of durable and non-corrosive wire strands directly conjoined to each other for defining a plurality of outwardly flanging sides and a horizontal registered bottom surface, first one of said wire strands having a continuous and unitary body provided with end portions disposed along said base member, said first one of said wire strands including a plurality of support pegs monolithically formed therewith and selectively spaced beneath said bottom surface, said first one of said wire strands further having a plurality of monolithically formed lip portions spaced along a longitudinal length of said base member, said first one of said wire strands further having a centrally registered annular portion monolithically formed with said lip portions, said annular portion extending upwardly from said base member and traveling inwardly towards a center thereof such that said annular portion defines an oblique angle offset from a centrally registered vertically axis and terminates substantially medially between said base member, a second one of said wire strands having opposed end portions directly conjoined to said annular portion and said base member such that said annular portion can adequately support the lid at an upright position during operating conditions; and
   a tray having a solid surface suitably sized and shaped for being seated on said base member, said tray including a substantially planar bottom surface and monolithically formed edges diverging outwardly along said base member, said tray being centrally positioned beneath said annular portion for catching fluids and debris dripping off the lid and the cooking utensils.

2. The apparatus of claim 1, wherein said lip portions are coextensively shaped for supporting the cooking utensils thereon.

3. The apparatus of claim 1, wherein said annular portion has a fixed diameter.

4. The apparatus of claim 1, wherein said support pegs have coextensive arcuate shapes equidistantly spaced from the longitudinal axis for balancing a weight of the lids and the cooking utensils supported on said base member.

5. The apparatus of claim 1, wherein said second one of said wire strands travels downwardly and oppositely from said annular portions and wraps around and travels beneath said base member wherein one said end portions of said second one of said wire strands is directly coupled to said base member for distributing a load of the lid and the cooking utensils when the user carriers the apparatus by gripping an apex of said annular portion during transport.

6. An apparatus for supporting pot lids and culinary implements thereon during cooking operations, said apparatus comprising:
   a base member formed from a plurality of durable and non-corrosive wire strands directly conjoined to each other for defining a plurality of outwardly flanging sides and a horizontal registered bottom surface, a first one of said wire strands having a continuous and unitary body provided with end portions disposed along said base member, said first one of said wire strands including a plurality of support pegs monolithically formed therewith and selectively spaced beneath said bottom surface, said first one of said wire strands further having a plurality of monolithically formed lip portions spaced along a longitudinal length of said base member, said first one of said wire strands further having a centrally registered annular portion monolithically formed with said lip portions, said annular portion extending upwardly from said base member and traveling inwardly towards a center thereof such that said annular portion defines an oblique angle offset from a centrally registered vertically axis and terminates substantially medially between said base member, a second one of said wire strands having opposed end portions directly conjoined to said annular portion and said base member such that said annular portion can adequately support the lid at an upright position during operating conditions;
   a tray having a solid surface suitably sized and shaped for being seated on said base member, said tray including a substantially planar bottom surface and monolithically formed edges diverging outwardly along said base member, said tray being centrally positioned beneath said annular portion for catching fluids and debris dripping off the lid and the cooking utensils; and
   a plurality of rubber caps removably positioned about said support pegs, said rubber caps increasing surface area friction between said base member and a support surface for assisting to maintain said apparatus at a substantially stable position.

7. The apparatus of claim 6, wherein said lip portions are coextensively shaped for supporting the cooking utensils thereon.

8. The apparatus of claim 6, wherein said annular portion has a fixed diameter.

9. The apparatus of claim 6, wherein said support pegs have coextensive arcuate shapes equidistantly spaced from the longitudinal axis for balancing a weight of the lids and the cooking utensils supported on said base member.

10. The apparatus of claim 6, wherein said second one of said wire strands travels downwardly and oppositely from said annular portions and wraps around and travels beneath said base member wherein one said end portions of said second one of said wire strands is directly coupled to another said base member for distributing a load of the lid and the cooking utensils when the user carriers the apparatus by gripping an apex of said annular portion during transport.

11. An apparatus for supporting pot lids and culinary implements thereon during cooking operations, said apparatus comprising:
   a base member formed from a plurality of durable and non-corrosive wire strands directly conjoined to each other for defining a plurality of outwardly flanging sides and a horizontal registered bottom surface, a first one of said wire strands having a continuous and unitary body provided with end portions disposed along said base member, said first one of said wire strands including a plurality of support pegs monolithically formed therewith and selectively spaced beneath said bottom surface, said first one of said wire strands further having a plurality of monolithically formed lip portions spaced along a longitudinal length of said base member, said lip portions being equidistantly spaced apart from a centrally registered latitudinal axis bifurcating said base member, said first one of said wire strands further having a centrally registered annular portion monolithically formed with said lip portions, said annular portion extending upwardly from said base member and traveling inwardly towards a center thereof such that said annular portion defines an oblique angle offset from a centrally registered vertically axis and terminates substantially medially between said sides of said base member, a second one of said wire strands having opposed end portions directly conjoined to said annular portion and said base member such that said annular portion can adequately support the lid at an upright position during operating conditions;

a tray having a solid surface suitably sized and shaped for being seated on said base member, said tray including a substantially planar bottom surface and monolithically formed edges diverging outwardly along said sides of said base member, said tray being centrally positioned beneath said annular portion for catching fluids and debris dripping off the lid and the cooking utensils; and a plurality of rubber caps removably positioned about said support pegs, said rubber caps increasing surface area friction between said base member and a support surface for assisting to maintain said apparatus at a substantially stable position.

12. The apparatus of claim 11, wherein said lip portions are coextensively shaped for supporting the cooking utensils thereon.

13. The apparatus of claim 11, wherein said annular portion has a fixed diameter.

14. The apparatus of claim 11, wherein said support pegs have coextensive arcuate shapes equidistantly spaced from the longitudinal axis for balancing a weight of the lids and the cooking utensils supported on said base member.

15. The apparatus of claim 11, wherein said second one of said wire strands travels downwardly and oppositely from said annular portions and wraps around beneath said base member wherein one said end portions of said second one of said wire strands is directly coupled to said base member for distributing a load of the lid and the cooking utensils when the user carriers the apparatus by gripping an apex of said annular portion during transport.

* * * * *